May 24, 1932.  W. E. THIBODEAUX  1,859,349
LIGHTING SYSTEM FOR AUTOMOBILE LIFTS
Filed Aug. 11, 1930  2 Sheets-Sheet 1
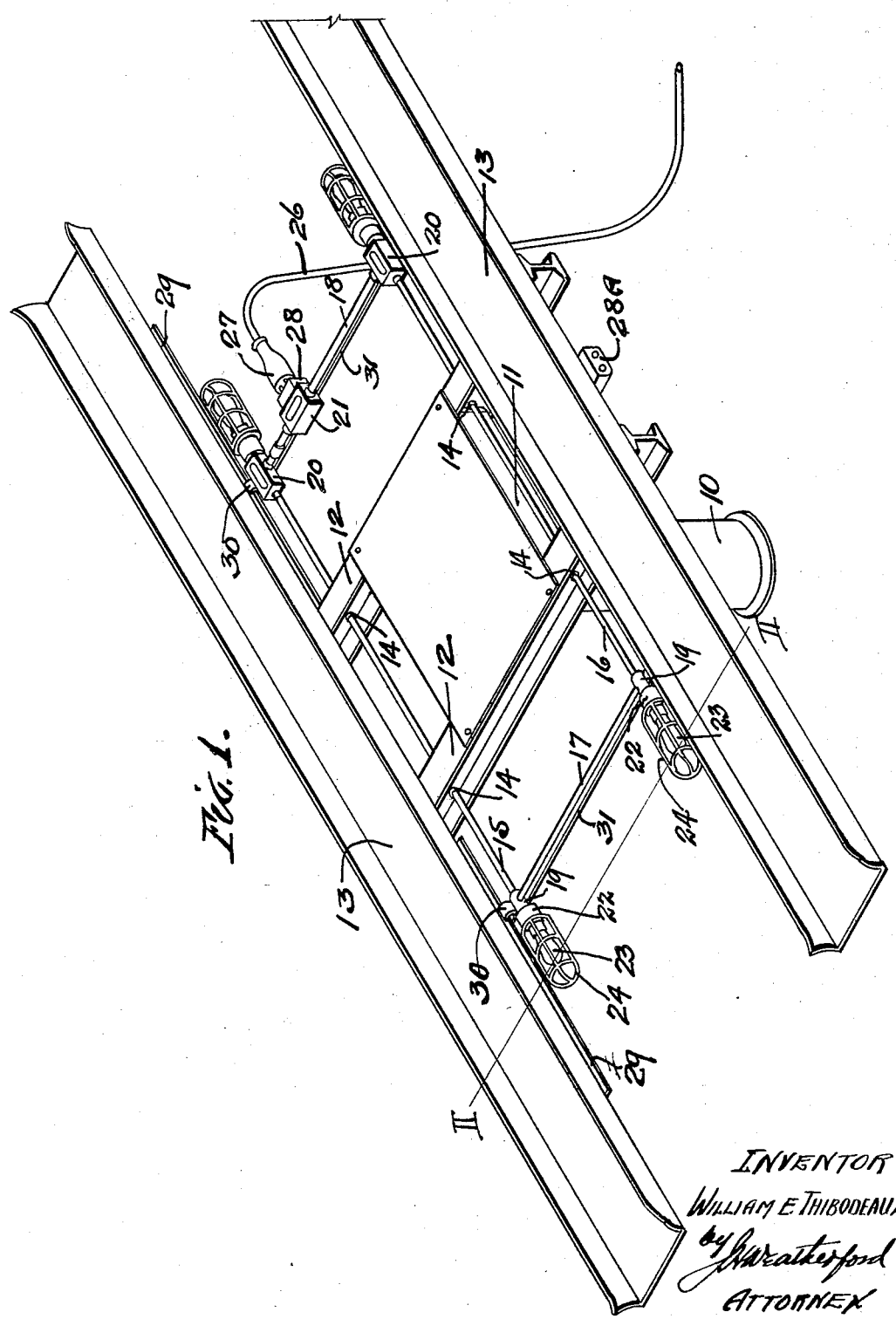

May 24, 1932. W. E. THIBODEAUX 1,859,349
LIGHTING SYSTEM FOR AUTOMOBILE LIFTS
Filed Aug. 11, 1930 2 Sheets-Sheet 2
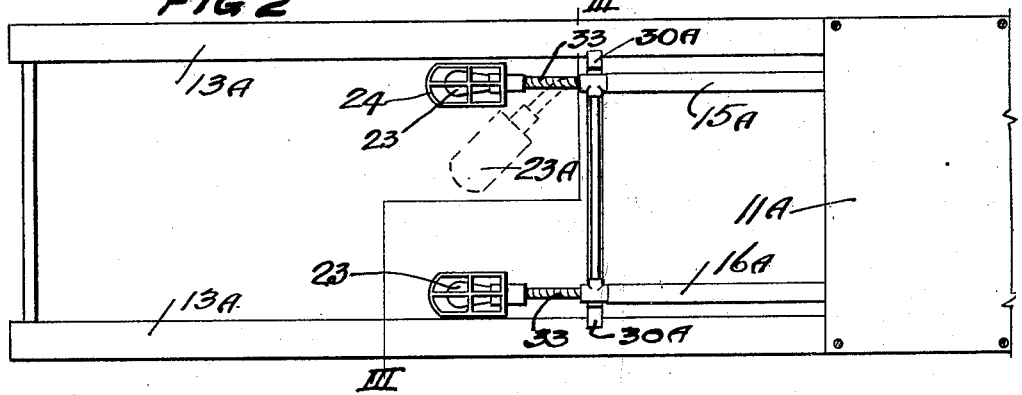
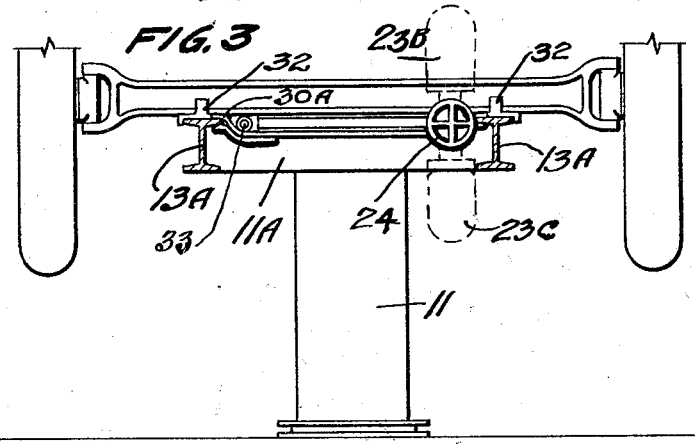
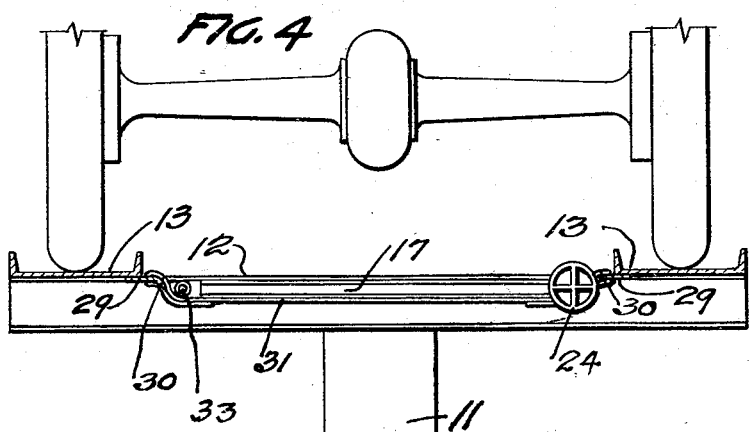
INVENTOR
WILLIAM E. THIBODEAUX
ATTORNEY Patented May 24, 1932

1,859,349

UNITED STATES PATENT OFFICE

WILLIAM E. THIBODEAUX, OF CLEVELAND, OHIO

LIGHTING SYSTEM FOR AUTOMOBILE LIFTS

Application filed August 11, 1930. Serial No. 474,559.

This invention relates to improvements in means for lighting the understructure of an automobile when it is supported upon a lift or elevator, such as is now largely employed for raising automobiles in order that access may be had to the underbody thereof for examination, adjustment, greasing and other purposes.

When an automobile is raised on such a lift it is evident that while light is readily provided for the exterior parts of the car that no matter how efficient the lighting system may be, little if any light is thrown on those parts of the car which are between the wheels. In order to minimize and correct this it has been necessary to use portable lights of various kinds which are moved and hung around beneath the superstructure of the car to furnish light, the results obtained however being more or less a makeshift and inefficient.

The objects of the present invention are:

To provide a simple and efficient means for supporting a lighting system which will efficiently light up the car understructure with a minimum of shaded points, if not entire absence thereof, which will be self supporting, and will be readily adjustable to bring the lights into proper relation to particular parts of the car which are being worked on.

The means by which the foregoing and other objects are accomplished and the manner of their accomplishment will readily be understood from the following specification by reference to the accompanying drawings, in which:

Fig. 1 is a perspective view of one form of lift table now in common use, showing my lighting device carried thereby;

Fig. 2 is a fragmentary plan showing the device slightly modified applied to a modified form of table.

Fig. 3 is a transverse section taken as on the line III—III of Fig. 2; and

Fig. 4 a similar section on the line IV—IV of Fig. 1.

Referring now to the drawings in which the various parts are indicated by numerals, 10 indicates the plunger of a vehicle lift or elevator which plunger may be raised or lowered in any usual or desired manner. Carried by the upper end of this plunger is a head 11 to which are secured a pair of transverse struts 12, which support a pair of rails 13. These rails in usual practice are lowered to the surface of the ground so that an automobile may be driven thereon and when centered over the plunger, may be blocked to prevent longitudinal displacement and thereafter be raised.

Holes 14 are provided in each of the transverse beams 12 and through these holes two longitudinally disposed sections of conduit pipe 15 and 16 are disposed. These two sections of pipe form the side members of a rectangular frame which is completed by similar but shorter transverse sections of pipe 17 and 18. The pipe 17 is connected to the pipes 15 and 16 by T's 19 and the pipe 18 to the opposite ends of these same pipes by condulets 20. This pipe is interrupted and a similar condulet 21 placed therein.

Each of the T's 19 carries a socket 22 in which is disposed a light bulb 23. 24 is a guard shielding the bulb. Similar sockets and associated parts are carried by the condulets 20.

26 is a cable carrying wires leading from a source of current not shown to provide lighting current. 27 is a separable plug member on this cable and 28 the complementary plug member, supported by the condulet 21, and connected to the current wires leading through the conduits to the lights.

Should the lift be powered by a motor (not shown), in the plunger or head a similar plug member 28A may be mounted on one of rails 13 adjacent the head 11 and the plug member 27 be used optionally for power or lighting.

The wiring through the conduits being usual and well known need not here be shown.

The frame made up of the conduits 15, 16, 17 and 18 may be shifted longitudinally by merely sliding the conduits 15 and 16 in the holes 14, and the slides 30 along the guides 29, and by such shifting accomplishes longitudinal positioning of the lights relatively to the various parts of a car which is supported on the rails.

When the conduits have been drawn out to their full limit in either direction there is a tendency for the free end to sag down. To overcome this, guides 29 may be secured to the rails 13 and slides 30 be attached to the conduits, these slides engaging and being slidable along the guides. Preferably bars 31 are extended from side to side beneath the conduits 17 and 18, and are secured thereto in desired manner, the ends of these bars forming parts of the slides 30.

The light from each bulb is thrown directly upward and also transversely across to the opposite side so that complete and efficient illumination of the under parts of the auto are had and even where obstructions are temporarily between one light and certain parts of the machine, ordinarily the other light is fully efficient.

It is of course obvious that this device may be used with other forms of lifting table such as that which is known as a free wheel table, and such form of table is shown in section in Fig. 3, in which 13A are rails which are supported directly by the plunger head 11A, these rails engaging directly, or as through shoes 32, the auto axle to raise the auto. In this modification the longitudinal frame members 15A, 16A, are shown of angle iron instead of pipe and in such case similar members may be used for the transverse members, I prefer also in this form to carry the light bulbs 23 on short flexible conduits 32 which may be bent upward or downward to position the lights above or below the rails 13A.

If desired slides 30A may be used in this type also, these slides preferably sliding on flanges of the rails 13A.

It will readily be seen that while I prefer to use conduit pipe and thereby protect the cable against oil and grease, this is not absolutely necessary, since other sections such as the one shown in Figs. 3 and 4, may readily be substituted.

It is also to be distinctly understood that while I prefer to use the transverse member 17 as a part of the frame it may be dispensed with if so desired. Also the flexible arm may be used in connection with other forms should that be deemed necessary.

It will be noted also that the bottom of the light bulbs 23 and the associated structure is above the bottom of the lift table and the top of these bulbs and parts, below the top of the table, so that the entire lighting device lies within the vertical limits of the table and is thereby protected from striking the floor when the lift is lowered or from being struck by parts of the auto being placed thereover.

In using the device the table is lowered, an auto driven on and raised in the usual manner. The separable plug parts 27 and 28 are then connected to turn on the lights, and the frame carrying the lights is shifted longitudinally forward or backward along the rails to position the lights with desired relation to the parts of the auto to be worked on.

Where the flexible conduit section 33 shown in Figs. 2 and 3, is used, sections may be bent to position the light laterally as shown in Fig. 2, by the dotted position 23A; upward to the position 23B; or downward to the position 23C; so that the rails 13A will not interfere with light from the bulb reaching the desired part of the auto.

Having described my invention, what I claim is:

1. In an automobile lift having longitudinal rails, a plurality of rigidly interconnected lights, disposed between said rails, slidably supported by said lift, and shiftable relatively to said rails.

2. In a device of the character described, the combination with a horizontally disposed lift table, of a frame of conduit pipe supported by said table and within the horizontal and vertical limits thereof, said frame being shiftable with respect to said table, light bulbs carried by said frame and current wires leading through said conduits to said bulbs.

3. In a device of the character described, the combination with a vertically movable lift including a pair of longitudinally disposed vehicle supporting rails, of means for illuminating the underside of a vehicle supported on said rails, comprising a pair of longitudinally disposed conduit pipes disposed along and between said rails, said pipes being supported by, and longitudinally slidable relative to, said lift, transverse conduit pipes rigidly connecting said longitudinal pipes into a rigid frame, a plurality of light bulbs carried by said pipes, and current wires leading through said conduits to said bulbs.

4. In a device of the character described the combination with a vertically movable lift including a pair of longitudinally disposed vehicle supporting rails and a transverse support carrying said rails, said transverse support being apertured adjacent said rails, of means for illuminating a vehicle supported on said rails, comprising a pair of parallel longitudinal conduits, one disposed adjacent each of said rails and slidably disposed through the corresponding apertures, whereby said conduits are slidably carried by said supports, transverse conduits connecting said longitudinal conduits into a rigid frame, light bulbs carried by said conduits, and current wires leading from a source of electricity through said conduits to said bulbs.

5. In a device of the character described the combination with a vertically movable lift including a pair of longitudinally disposed vehicle supporting rails and a transverse support carrying said rails, said transverse support being apertured adjacent said rails, of means for illuminating a vehicle supported on said rails, comprising a pair of parallel longitudinal members, one disposed adjacent each of said rails and slidably disposed through the corresponding apertures, whereby said members are slidably carried by said supports, transverse members connecting said longitudinal members into a rigid frame, light bulbs carried by said frame and current wires leading from a source of electricity along said members to said bulbs.

In testimony whereof I hereunto affix my signature.

WILLIAM E. THIBODEAUX.